(12) United States Patent
Kato et al.

(10) Patent No.: US 11,408,465 B2
(45) Date of Patent: Aug. 9, 2022

(54) SLIDING BEARING

(71) Applicant: TAIHO KOGYO CO., LTD., Toyota (JP)

(72) Inventors: Shintaro Kato, Toyota (JP); Kohei Fukami, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 0 days.

(21) Appl. No.: 17/057,336

(22) PCT Filed: May 31, 2019

(86) PCT No.: PCT/JP2019/021806
§ 371 (c)(1),
(2) Date: Nov. 20, 2020

(87) PCT Pub. No.: WO2019/235388
PCT Pub. Date: Dec. 12, 2019

(65) Prior Publication Data
US 2021/0190136 A1 Jun. 24, 2021

(30) Foreign Application Priority Data
Jun. 4, 2018 (JP) .............................. JP2018-107221

(51) Int. Cl.
*F16C 17/02* (2006.01)
*F16C 9/02* (2006.01)
*F16C 33/10* (2006.01)

(52) U.S. Cl.
CPC .............. *F16C 17/022* (2013.01); *F16C 9/02* (2013.01); *F16C 33/1065* (2013.01); *F16C 2240/30* (2013.01)

(58) Field of Classification Search
CPC ...... F16C 9/02; F16C 17/022; F16C 33/1045; F16C 33/1065; F16C 33/14;
(Continued)

(56) References Cited

U.S. PATENT DOCUMENTS 4,235,481 A * 11/1980 Fukuoka ............... F16C 17/022
384/431
7,281,854 B2 * 10/2007 Terada ................ F16C 33/1065
384/288
(Continued)

FOREIGN PATENT DOCUMENTS

CN 200949604 Y 9/2007
DE 102006010698 A1 9/2007
(Continued)

OTHER PUBLICATIONS

International Search Report for International Application No. PCT/JP2019/021806; dated Aug. 13, 2019.
(Continued)

*Primary Examiner* — Phillip A Johnson
(74) *Attorney, Agent, or Firm* — Cantor Colburn LLP

(57) ABSTRACT

Provided is a sliding bearing having an improved circularity and having achieved an increase in contact area with respect to a holder. The sliding bearing 1 comprises a pair of an upper halved member 2 and a lower halved member 3 which are portions of a cylinder halved in parallel to an axial direction. The sliding bearing has an oil hole 24 penetrating therethrough in a direction orthogonal to the axial direction of the cylinder. An inner peripheral portion 24a of the oil hole 24 has formed a laser-melted portion 25 which is an area in which a change in property in comparison to the original material has been caused by the thermal influence of laser.

8 Claims, 7 Drawing Sheets

(58) Field of Classification Search
CPC .. F16C 2240/30; F16C 2360/22; B23K 15/08; B23K 26/354; B23K 26/362; B23K 26/382; B23K 26/284
See application file for complete search history.

(56) References Cited

U.S. PATENT DOCUMENTS

| | | | | |
|---|---|---|---|---|
| 9,062,714 | B2 * | 6/2015 | Kato | ............... F16C 3/14 |
| 9,951,807 | B2 * | 4/2018 | Seki | ............ F16C 33/1065 |
| 2005/0263125 | A1 | 12/2005 | Terada et al. | |
| 2016/0223016 | A1 | 8/2016 | Ito et al. | |
| 2019/0257356 | A1 | 8/2019 | Ito et al. | |

FOREIGN PATENT DOCUMENTS

| | | | | | |
|---|---|---|---|---|---|
| DE | 102016220595 | A1 | | 4/2018 | |
| JP | 2004211750 | A | * | 7/2004 | ............ F16C 33/10 |
| JP | 2004322116 | A | * | 11/2004 | ............ B23K 26/14 |
| JP | 2006144913 | A | | 6/2006 | |
| JP | 2006194272 | A | * | 7/2006 | ............... F16J 9/20 |
| JP | 2007205254 | A | | 8/2007 | |
| JP | 2008095858 | A | * | 4/2008 | ........... F16C 33/106 |
| JP | WO2008153041 | A1 * | | 8/2010 | .......... B23K 26/354 |
| JP | 2011085260 | A | * | 4/2011 | ........... F16C 17/022 |
| JP | 5673610 | B2 * | | 2/2015 | ............ C23C 14/56 |
| JP | 2015092097 | A | | 5/2015 | |
| JP | 2016191420 | A | * | 11/2016 | |
| JP | 2016191420 | A | | 11/2016 | |
| JP | 2017166680 | A | | 9/2017 | |
| KR | 20080028331 | A | * | 3/2008 | .......... F16C 33/1065 |
| TW | I575730 | B | * | 3/2017 | ......... H01L 51/5228 |
| WO | WO-2017090287 | A1 * | | 6/2017 | ........... F16C 33/046 |
| WO | WO-2017104795 | A1 * | | 6/2017 | ............... F16C 9/02 |
| WO | 2017126399 | A1 | | 7/2017 | |
| WO | WO-2017126399 | A1 * | | 7/2017 | ............... H02K 7/08 |

OTHER PUBLICATIONS

PCT International Preliminary Report on Patentability for corresponding PCT/JP2019/021806; dated Sep. 1, 2020.
Auerswald, J., "Hot dance with high precision" Mikroproduktion, Feb. 2015; 4 pages.
DPMA First Office Action for corresponding DE Application No. 112019002816.2; dated Nov. 11, 2021.
Laser Cutting: Wikipedia, Working status: Feb. 10, 2018, 01:03 p.m. URL: https://de.wikipedia.org/w/index.php?title=Laserschneiden &oldid=173848580 [retrieved Nov. 10, 2021]; 15 pages.
CNIPA First Office Action for corresponding CN Application No. 201980034014.6; dated Jan. 6, 2022.

* cited by examiner

SLIDING BEARING

CROSS REFERENCE TO RELATED APPLICATIONS

This is the U.S. national stage of application No. PCT/JP2019/021806, filed on May 31, 2019. Priority under 35 U.S.C. § 119(a) and 35 U.S.C. § 365(b) is claimed from Japanese Application No. 2018-107221, filed Jun. 4, 2018, the disclosure of which is also incorporated herein by reference.

TECHNICAL FIELD

The present invention relates to a technique of a sliding bearing, and to a technique of a sliding bearing having an oil hole.

BACKGROUND ART

Conventionally, there is known a bearing for pivotally supporting a crankshaft of an engine, which is a sliding bearing having a halved structure in which two members that are portions of a cylindrical shape halved are joined together. Further, in such a sliding bearing, there is known a configuration in which an oil hole penetrating therethrough from an outer peripheral surface to an inner peripheral surface of the cylindrical shape is formed. An example of the sliding bearing including an oil hole is a sliding bearing disclosed in Patent Literature 1.

CITATIONS LIST

Patent Literature

Patent Literature 1: JP-A 2016-191420 Gazette

SUMMARY OF INVENTION

Technical Problems

Conventionally, an oil hole provided in a sliding bearing is formed by punching using a die and a punch. Therefore, since a shear load is applied to a conventional sliding bearing when an oil hole is formed, the sliding bearing is distorted, which leads to a decrease in circularity. Further, in a case where a die and a punch are used, a burr protruding in the removing direction is formed around the oil hole, and the contact area with respect to a holder that supports the sliding bearing is reduced.

Therefore, the present invention has been made in view of the above problems, and provides a sliding bearing having an improved circularity and having achieved an increase in contact area with respect to a holder.

Solution to Problems

The problems to be solved by the present invention are as described above. Next, means for solving the problems will be described.

That is, a sliding bearing according to the present invention is a sliding bearing having a pair of halved members which are portions of a cylinder halved in parallel to an axial direction. The sliding bearing has an oil hole penetrating therethrough in a direction orthogonal to the axial direction of the cylinder. An inner peripheral portion of the oil hole has formed a laser-melted portion.

Furthermore, a sliding bearing according to the present invention is a sliding bearing having an integral cylindrical member. The sliding bearing has an oil hole penetrating therethrough in a direction orthogonal to the axial direction of the cylinder. An inner peripheral portion of the oil hole has formed a laser-melted portion.

Furthermore, in the sliding bearing according to the present invention, the laser-melted portion exists within a range of less than 50 μm from a surface of the inner peripheral portion of the oil hole.

Furthermore, in the sliding bearing according to the present invention, a circularity of an outer shape of the cylinder is 20 μm or less.

Furthermore, in the sliding bearing according to the present invention, the oil hole is a long hole extending in a circumferential direction, and the long hole has a length of ⅙ or more of a half circumference of the cylinder.

Furthermore, in the sliding bearing according to the present invention, a degree of contour of an inner diameter of the oil hole is 0.15% or less of the inner diameter of the oil hole.

Advantageous Effects of Invention

The effects of the present invention are as follows.

In a sliding bearing according to the present invention, a circularity can be improved and an increase in contact area with respect to a holder can be achieved.

BRIEF DESCRIPTION OF DRAWINGS

FIG. 2A is a bottom view thereof, and FIG. 2B is a sectional view thereof taken along line II-II in FIG. 2A.

FIG. 3A is a plan view thereof, and FIG. 3B is a front view thereof.

FIG. 5A is a bottom view thereof, and FIG. 5B is a sectional view thereof taken along line V-V in FIG. 5A.

DESCRIPTION OF EMBODIMENTS

Figure 1:
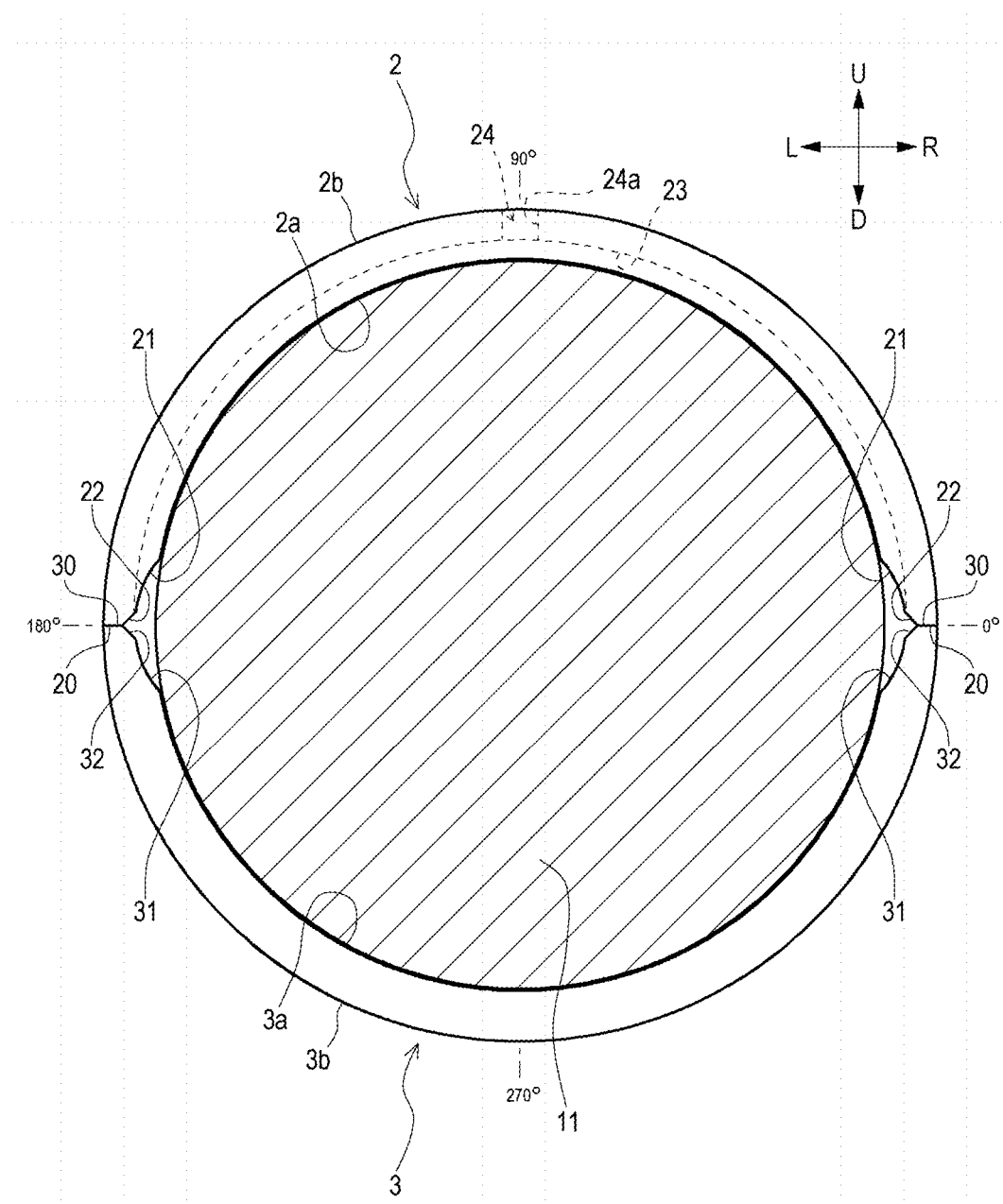
FIG. 1 is a front view illustrating a state where a crankshaft is supported by a sliding bearing according to an embodiment of the present invention.

Next, embodiments of the invention will be described. Note that in the following, directions indicated by arrow U, arrow D, arrow L, and arrow R illustrated in FIG. 1 are defined as upward, downward, leftward, and rightward, respectively, and the same applies to the other drawings. Furthermore, the front side of the sheet surface and the back side of the sheet surface in FIG. 1 are defined as the front side and the rear side, respectively, and the same applies to the other drawings. The front side is indicated by arrow F and the rear side is indicated by arrow B. Furthermore, the bearing angle ω around the cylinder axis of the sliding bearing 1 is defined assuming that the right end position in FIG. 1 is 0 degrees and the counterclockwise direction in FIG. 1 is the positive direction. That is, the bearing angle ω at the upper end position in FIG. 1 is defined as 90 degrees, the bearing angle ω at the left end position as 180 degrees, and the bearing angle ω at the lower end position as 270 degrees. Moreover, the rotation direction of the crankshaft 11 is clockwise in FIG. 1.

First, the overall structure of a sliding bearing will be described.

A sliding bearing 1 illustrated in FIG. 1 is an embodiment of the sliding bearing according to the present invention. The sliding bearing 1 is a metal bearing having a cylindrical shape, and is applied to a sliding bearing structure of a crankshaft 11 of an engine.

The sliding bearing 1 includes an upper halved member 2 and a lower halved member 3. Each of the upper halved member 2 and the lower halved member 3 has a shape obtained by halving a cylinder by a plane passing through the cylinder axis, and has a semicircular shape as viewed in the cylinder axis direction. Note that the direction along the circumference of the sliding bearing 1 as viewed in the cylinder axis direction is defined as the circumferential direction, and the direction orthogonal to the circumferential direction is defined as the radial direction.

The sliding bearing 1 is configured by disposing the upper halved member 2 on the lower halved member 3 such that mating surfaces of the upper halved member 2 and the lower halved member 3 are located on a horizontal plane.

Figure 2A:
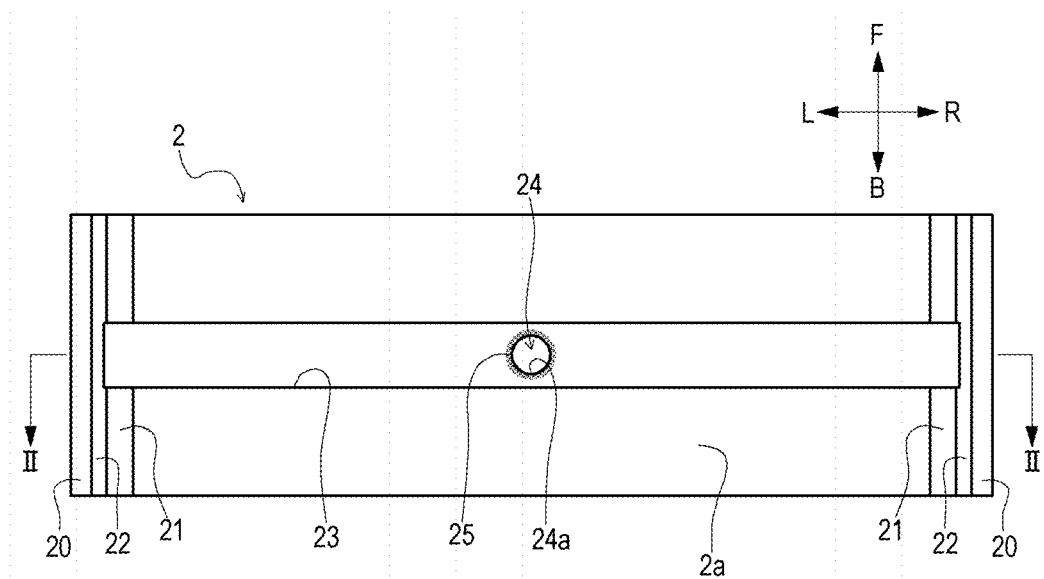
FIG. 2A and FIG. 2B are views illustrating a first embodiment of an upper halved member constituting the sliding bearing.
Figure 2B:
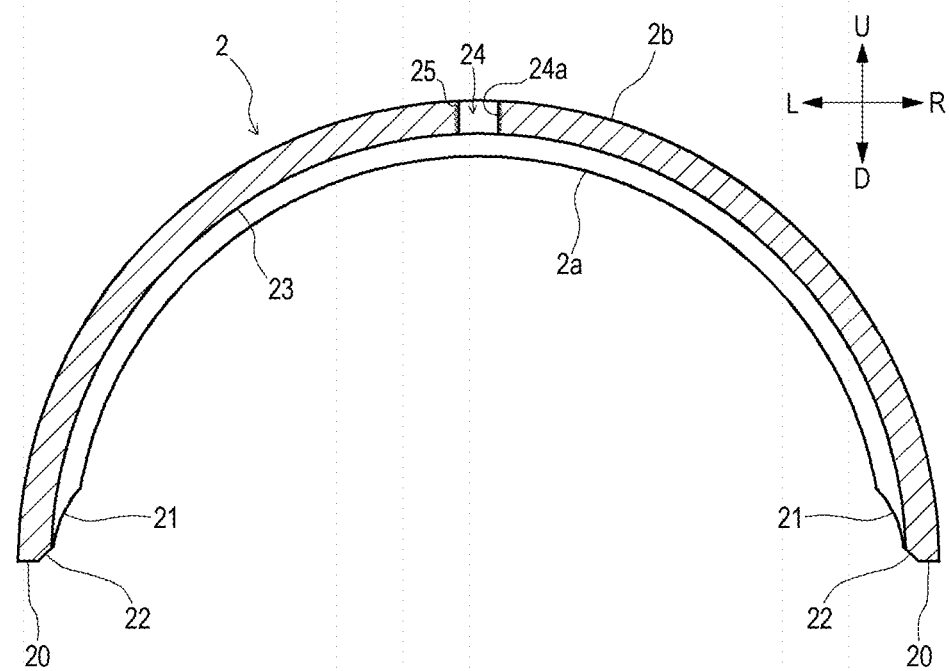

The upper halved member 2 is a first embodiment of an upper halved member that constitutes the sliding bearing according to the present invention. As illustrated in FIG. 2A and FIG. 2B, the upper halved member 2 includes mating surfaces 20, crush reliefs 21, chamfers 22, an oil groove 23, and an oil hole 24.

Each of the mating surfaces 20 is a planar area that is in contact with a mating surface (mating surface 30 described later) of the lower halved member 3. The mating surfaces 20 are a pair of right and left downward surfaces located at both right and left ends of the upper halved member 2. The crush reliefs 21 are areas obtained by cutting out both right and left edge portions of an inner peripheral surface 2a of the upper halved member 2, and are a pair of right and left crush reliefs. Each of the chamfers 22 is a planar area that connects an end portion of the mating surface 20 on the inner peripheral surface 2a side and a lower end portion of the crush relief 21. The right and left chamfers 22 form a pair.

The oil groove 23 is an area which has formed a groove portion having a substantially rectangular cross section along the circumferential direction at the center of the inner peripheral surface 2a of the upper halved member 2 in the front-rear direction.

The oil hole 24 is a through hole formed at a location where the bearing angle ω is 90 degrees in the upper halved member 2, and communicates with the oil groove 23. Note that even though a case where the oil hole 24 is formed at the location where the bearing angle ω is 90 degrees in the upper halved member 2 has been described as an example in the present embodiment; however, the location where the oil hole 24 is formed is not limited to this.

Figure 3A:
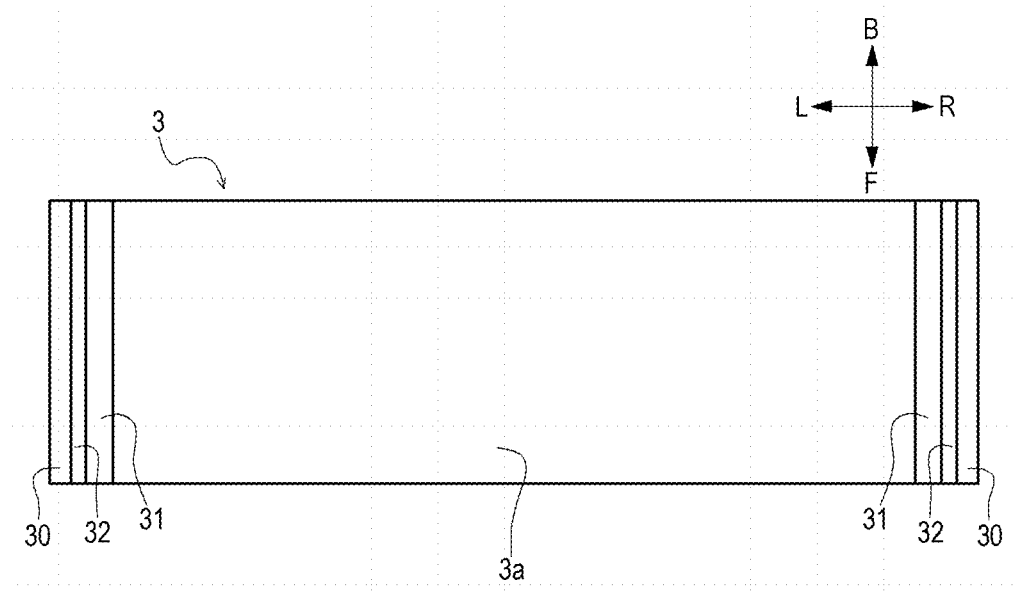
FIG. 3A and FIG. 3B are views illustrating a lower halved member constituting the sliding bearing.
Figure 3B:
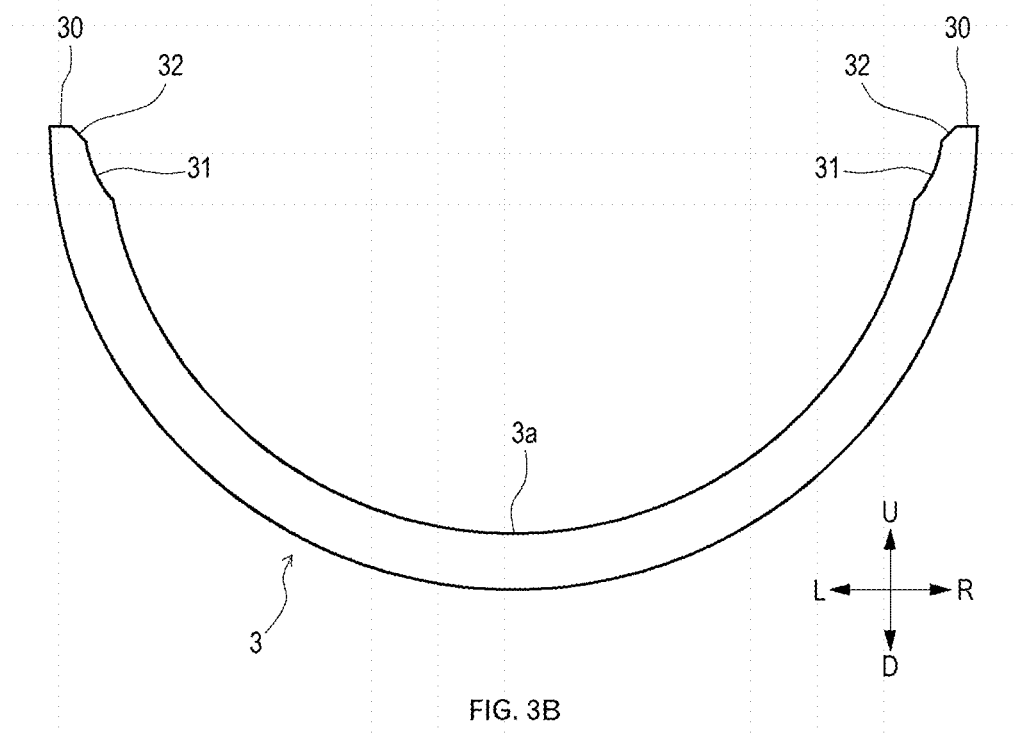

Furthermore, as illustrated in FIG. 3, the lower halved member 3 includes the mating surface 30, crush reliefs 31, and chamfers 32.

Each of the mating surfaces 30 is a planar area that is in contact with the mating surface 20 of the upper halved member 2. The mating surfaces 30 are a pair of right and left upward surfaces located at both right and left ends of the lower halved member 3. The crush reliefs 31 are areas obtained by cutting out both right and left edge portions of the inner peripheral surface 3a of the lower halved member 3, and are a pair of right and left crush reliefs. Each of the chamfers 32 is a planar area that connects an end portion of the mating surface 30 on the inner peripheral surface 3a side and a lower end portion of the crush relief 31. The right and left chamfers 32 form a pair. Note that no oil hole is provided in the lower halved member 3 illustrated in the present embodiment; however, the lower halved member 3 may be provided with an oil hole.

In a case where the crankshaft 11 is pivotally supported by the sliding bearing 1, a predetermined gap is formed, and lubricating oil is supplied from the oil hole 24 to this gap. The lubricating oil supplied to the gap is caused to flow in the circumferential direction along the oil groove 23 in accordance with rotation of the crankshaft 11.

Here, the upper halved member 2 will be described in more detail.

Figure 4:
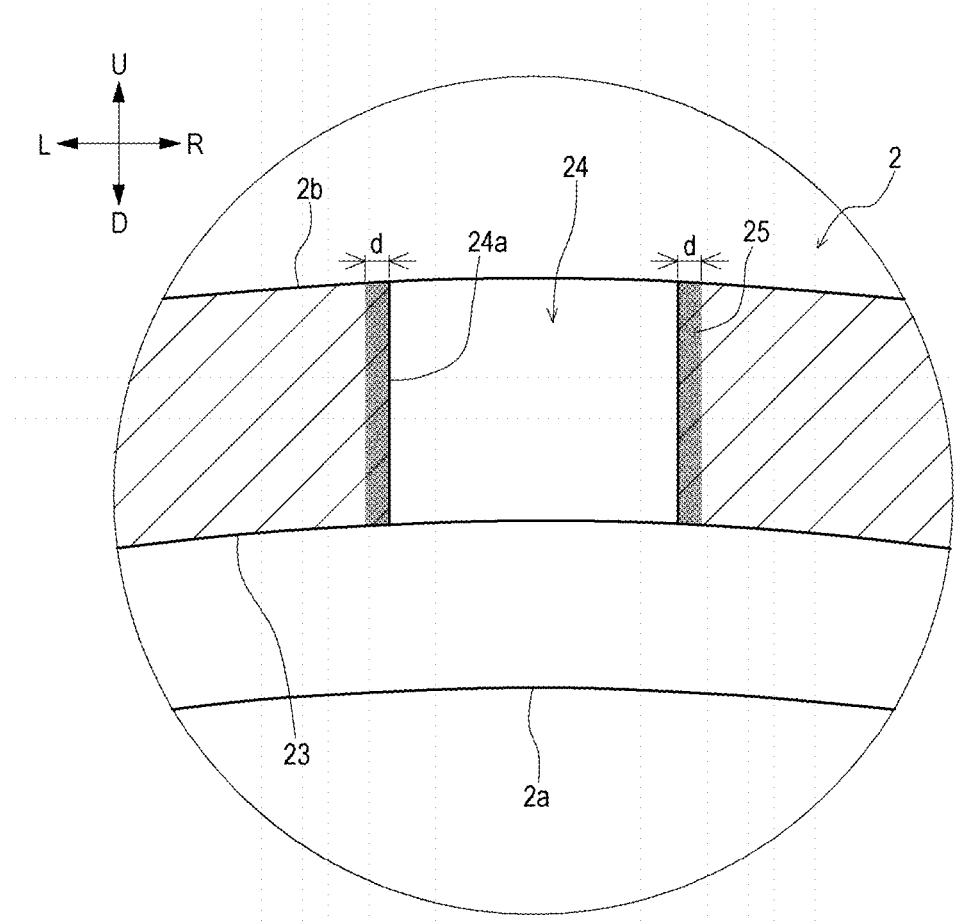
FIG. 4 is an enlarged sectional view around an oil hole of the upper halved member.

As illustrated in FIG. 2A, FIG. 2B, and FIG. 4, the upper halved member 2 is provided with a laser-melted portion 25 around the oil hole 24. The laser-melted portion 25 is an area formed by irradiating the upper halved member 2 with laser using a laser processing machine or the like to form the oil hole 24.

The laser-melted portion 25 is an area in which a change in property in comparison to the original material (blank material M to be described later) has been caused by the thermal influence of laser. Specifically, as illustrated in FIG. 4, the laser-melted portion 25 of the upper halved member 2 is an area formed in the outer peripheral region of the oil hole 24 in a range where a range d from the inner peripheral surface 24a of the oil hole 24 is less than 50 μm.

Furthermore, the laser-melted portion 25 differs from the area other than the laser-melted portion 25 in the upper halved member 2 in Vickers hardness, and the difference in Vickers hardness is less than 10 HV. That is, in the laser-melted portion 25, an increase in Vickers hardness is suppressed as compared with the area around an oil hole which is formed by a die and a punch. Therefore, in the upper halved member 2, conformability to a holder (not illustrated) that holds the sliding bearing 1 is improved, and contact area with respect to the holder is increased.

Furthermore, in the upper halved member 2 having the laser-melted portion 25, the oil hole 24 is formed by a laser processing method. Therefore, no external force is applied by a die and a punch when the oil hole 24 is formed. As a result, the upper halved member 2 having the laser-melted portion 25 can substantially maintain a circularity obtained in the halved member before the oil hole 24 is formed (blank material M to be described later). Therefore, in the sliding bearing 1 including the upper halved member 2 having the laser-melted portion 25, the circularity of the outer shape of the sliding bearing 1 may be 20 μm or less, preferably 15 μm or less, and more preferably 12 μm or less.

That is, the sliding bearing 1 includes the pair of upper halved member 2 and lower halved member 3 which are portions of the cylinder halved in parallel to the axial direction. The sliding bearing 1 includes the oil hole 24 penetrating therethrough in the direction orthogonal to the axial direction of the cylinder. The inner peripheral surface 24a of the oil hole 24 has formed the laser-melted portion 25 which is an area in which a change in property in comparison to the original material has been caused by the thermal influence of laser. The sliding bearing 1 including the laser-melted portion 25 has the oil hole 24 formed by a laser processing method. Therefore, the sliding bearing 1 has no distortion caused by punching, has an improved circularity, and has achieved an increase in the contact area with respect to the holder.

Furthermore, the laser-melted portion 25 in the sliding bearing 1 has the range d less than 50 μm from the surface of the inner peripheral portion 24a of the oil hole 24. In the sliding bearing 1 having the laser-melted portion 25 in which the range d is less than 50 μm, hardening of the outer peripheral portion of the oil hole 24 is suppressed and the contact area with respect to the holder is further increased.

Furthermore, the circularity of the outer shape of the sliding bearing 1 is 20 μm or less, preferably 15 μm or less, and more preferably 12 μm or less, and the contact area with respect to the holder can be further increased by improving the circularity of the outer shape.

Here, a second embodiment of the upper halved member will be described.

Figure 5A:
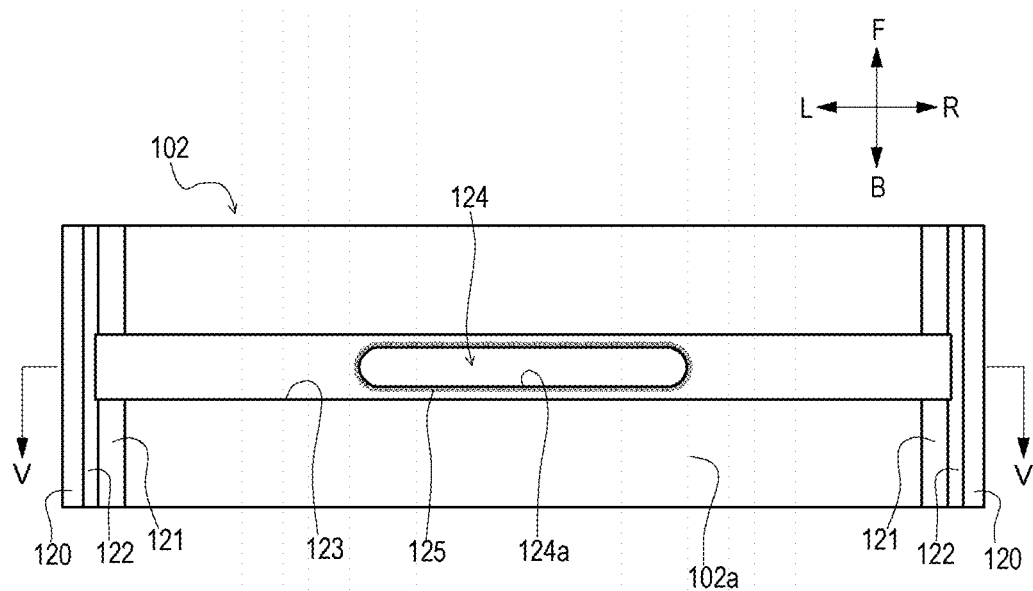
FIG. 5A and FIG. 5B are views illustrating a second embodiment of the upper halved member constituting the sliding bearing.
Figure 5B:
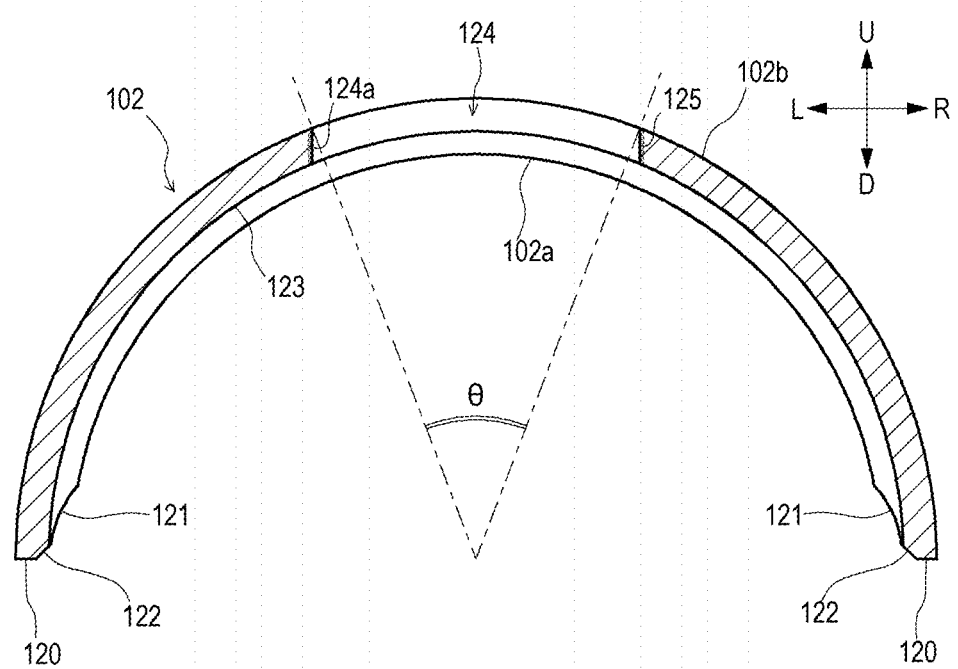

An upper halved member 102 illustrated in FIG. 5A and FIG. 5B is a second embodiment of the upper halved member that constitutes the sliding bearing according to the present invention, and includes mating surfaces 120, crush reliefs 121, chamfers 122, an oil groove 123, an oil hole 124, and a laser-melted portion 125. The upper halved member 102 differs from the upper halved member 2 according to the first embodiment in the forms of the oil hole 124 and the laser-melted portion 125. The upper halved member 102 is same as the upper halved member 2 in the area other than the oil hole 124 and the laser-melted portion 125.

The oil hole 124 is a long hole whose longitudinal direction is the circumferential direction, and the laser-melted portion 125 is formed in a range where a range d from an inner peripheral surface 124a of the oil hole 124 is less than 50 μm.

A halved member having a conventional oil hole which is a long hole is formed by using a die and a punch. Therefore, if the hole diameter in the longitudinal direction becomes large, a desired circularity of the sliding bearing cannot be ensured. As a result, the hole diameter in the longitudinal direction is limited to about ⅙ of the circumference of a semicircle.

The upper halved member 102 has the oil hole 124 whose hole diameter in the longitudinal direction exceeds ⅙ of the circumference of the semicircle (that is, θ>30°). Since the oil hole 124 is formed in the upper halved member 102 by a laser processing method, the circularity of the sliding bearing does not decrease due to an external force when the oil hole 124 is formed. Therefore, in the upper halved member 102, the oil hole 124 whose hole diameter in the longitudinal direction (circumferential direction) exceeds ⅙ of the circumference of the semicircle can be realized.

That is, the oil hole 124 in the sliding bearing 1 is a long hole extending in the circumferential direction, and the oil hole 124 has a length of ⅙ or more of the half circumference of the cylinder of the sliding bearing 1. In the sliding bearing 1 having such a structure, the oil hole shape which is conventionally difficult to be manufactured is realized.

Here, a method of forming the oil hole 24 will be described. Note that here, the method of forming the oil hole 24 in the upper halved member 2 according to the first embodiment will be described as an example. Since the method of forming the oil hole 124 in the upper halved member 102 according to the second embodiment is similar, the description thereof is omitted.

When the oil hole 24 is formed, the upper halved member 2 and the lower halved member 3 are combined to form a cylindrical member, and then an irradiation head H of laser L and the cylindrical member are relatively displaced to form the oil hole 24 by a laser processing method.

Figure 6:
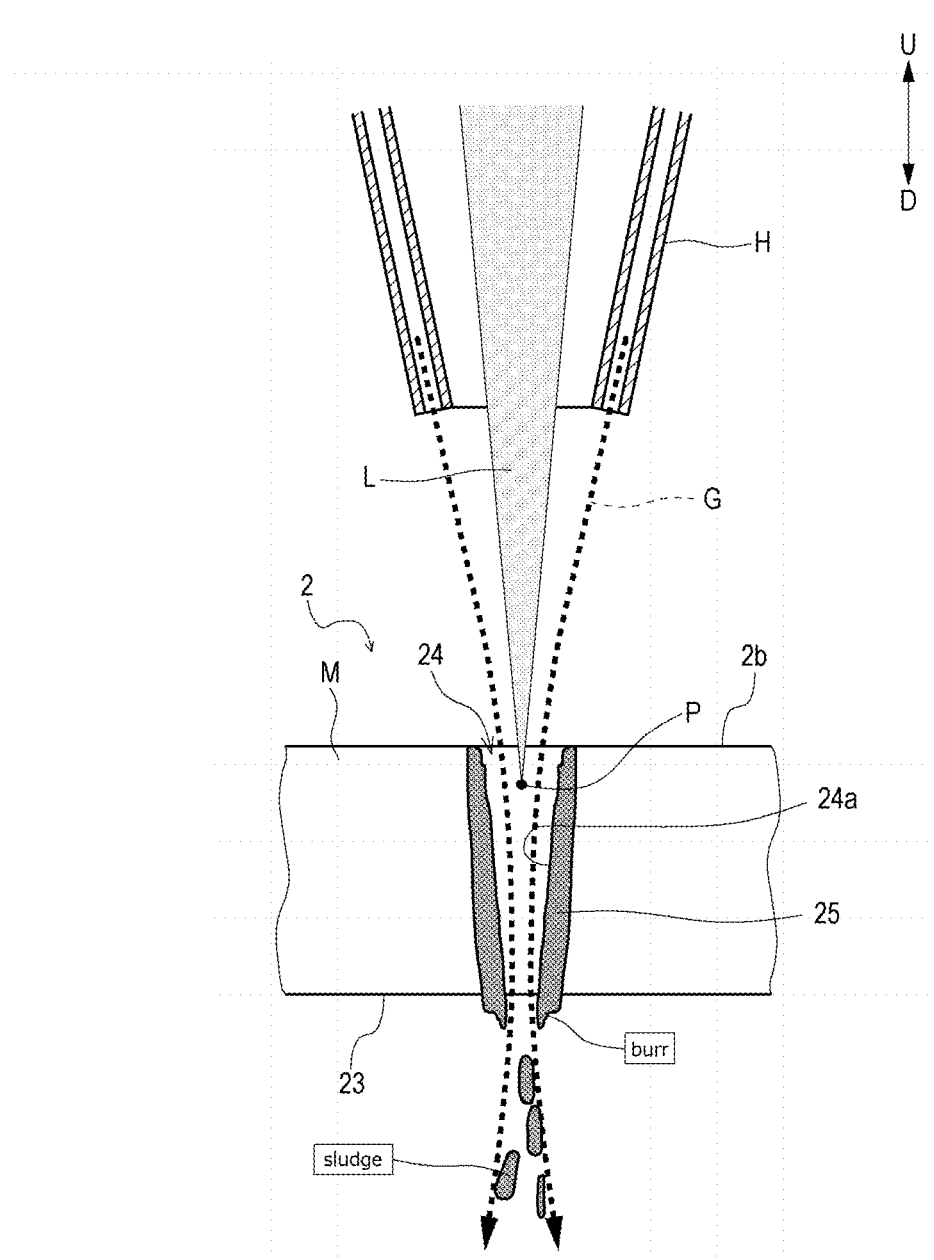
FIG. 6 is a schematic view illustrating a method of forming the oil hole by laser processing.

As illustrated in FIG. 6, the oil hole 24 is formed by irradiating a target location P where the oil hole 24 is to be formed in the upper halved member 2 constituting the cylindrical member with the laser L while supplying assist gas G to the target location P. When the oil hole 24 is formed, considering the diameter of the oil hole 24 to be formed and the thickness of the upper halved member 2, intensity of the laser L, the moving speed, the focal length, and the supply amount and the supply pressure of the assist gas G are adjusted such that the range d from the inner peripheral surface 24a of the laser-melted portion 25 is less than 50 μm.

In the present embodiment, the case where the laser L is emitted from the outer peripheral surface side of the upper halved member 2 (outer peripheral surface 2b side of the upper halved member 2) has been described as an example. However, the laser L may be emitted from the inner peripheral surface side of the upper halved member 2 (inner peripheral surface 2a side of the upper halved member 2) which constitutes the cylindrical member. Note that if the laser L is emitted from the outer peripheral surface side of the upper halved member 2, burrs formed on the outer peripheral surface side of the upper halved member 2 are minute, and burrs are mainly formed on the inner peripheral surface side of the upper halved member 2. The burrs on the inner peripheral surface side can be removed at the same time when finishing processing is applied to the inner peripheral surface. Therefore, in a case where the oil hole 24 is formed by the laser L, it is more preferable that the laser L is emitted from the outer peripheral surface side of the upper halved member 2.

Then, in the sliding bearing 1, by emitting the laser L to form the oil hole 24 of the upper halved member 2, the degree of contour of the inner diameter of the oil hole 24 can be set to 0.15% or less of the required size of the inner diameter of the oil hole 24.

That is, in the sliding bearing 1, the degree of contour the inner diameter of the oil hole 24 (especially a circularity in a case where the oil hole 24 is circular) is 0.15% or less of the inner diameter of the oil hole 24, and adhesion of foreign matter or the like which prevents entry and exit of lubricating oil into and from the oil hole 24 is suppressed. Furthermore, the sliding bearing 1 has an excellent aesthetic appearance.

Here, a third embodiment of the upper halved member will be described.

Figure 7:
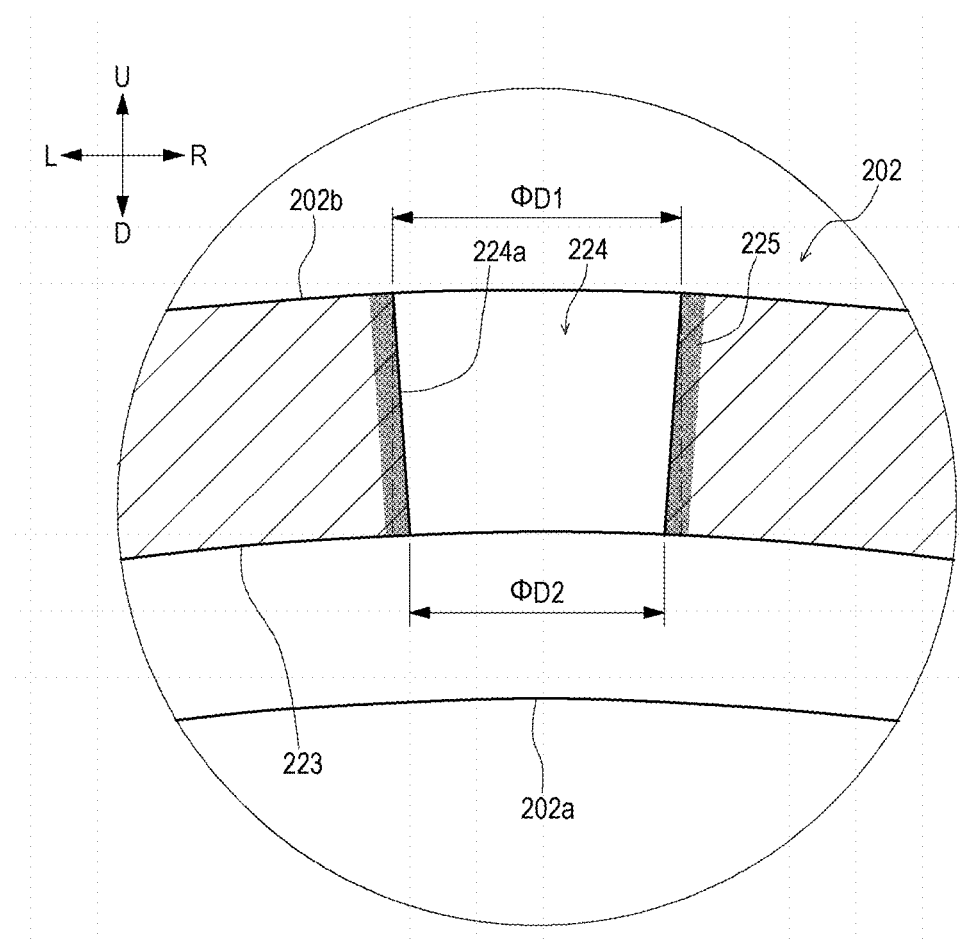
FIG. 7 is an enlarged sectional view around an oil hole of an upper halved member according to a third embodiment.

An upper halved member 202 illustrated in FIG. 7 is a third embodiment of the upper halved member that constitutes the sliding bearing according to the present invention, and includes an oil groove 223, an oil hole 224, and a laser-melted portion 225. The upper halved member 202 is same as the upper halved member 2 according to the first embodiment in the area other than the oil groove 223, the oil hole 224, and the laser-melted portion 225.

The oil hole 224 is a tapered hole portion in which the opening diameter φD2 on the inner peripheral surface 202a side is smaller than the opening diameter φD1 on the outer peripheral surface 202b side. The laser-melted portion 225 is formed in a range in which a range d from an inner peripheral surface 224a of the oil hole 224 is less than 50 μm. As described above, if laser L is emitted from the outer peripheral surface 202b side while displacing a blank material M without moving the irradiation head H of laser L to form an oil hole, the tapered oil hole 224 as illustrated in FIG. 7 is formed. That is, the oil hole 224 in the sliding bearing 1 is a tapered hole that expands or contracts in the radial direction of the cylinder.

Furthermore, in the sliding bearing according to the present invention, the oil hole may be formed by emitting the laser L from the inner peripheral surface side of the sliding bearing. In this case, a tapered oil hole (not illustrated) whose diameter is reduced as proceeding from the inner peripheral surface side to the outer peripheral surface side is formed.

Note that the sliding bearing 1 illustrated in the present embodiment is an example of the sliding bearing including a pair of halved bearings. However, similar effects can be obtained also in a sliding bearing (so-called a cylindrical bush) which includes an integral cylindrical member formed in a cylindrical shape and has a laser-melted portion formed around an oil hole. That is, a sliding bearing including an integral cylindrical member, having an oil hole penetrating therethrough in a direction orthogonal to the axial direction of the cylinder, and having a laser-melted portion formed on the inner peripheral portion of the oil hole, a circularity can be improved and an increase in contact area with respect to a holder can be achieved.

REFERENCE SIGNS LIST

1 sliding bearing
2 upper halved member
3 lower halved member
24 oil hole
24*a* inner peripheral surface (surface of inner peripheral portion)
25 laser-melted portion
124 oil hole (long hole)

The invention claimed is:

1. A sliding bearing, comprising:
a pair of halved members which are portions of a cylinder halved in parallel to an axial direction, the sliding bearing having an oil hole penetrating therethrough in a direction orthogonal to the axial direction of the cylinder,
wherein an inner peripheral portion of the oil hole has formed a laser-melted portion,
a circularity of an outer shape of the cylinder is 20 μm or less, and
the laser-melted portion exists within a range of less than 50 μm from a surface of the inner peripheral portion of the oil hole so that hardening of an outer peripheral portion of the oil hole is suppressed and a contact area with respect to a holder is increased.

2. The sliding bearing according to claim 1,
wherein the oil hole is a long hole extending in a circumferential direction, and
the long hole has a length of ⅙ or more of a half circumference of the cylinder.

3. The sliding bearing according to claim 2, wherein a degree of contour of an inner diameter of the oil hole is 0.15% or less of the inner diameter of the oil hole.

4. The sliding bearing according to claim 1, wherein a degree of contour of an inner diameter of the oil hole is 0.15% or less of the inner diameter of the oil hole.

5. A sliding bearing comprising:
an integral cylindrical member, the sliding bearing having an oil hole penetrating therethrough in a direction orthogonal to an axial direction of the cylinder,
wherein an inner peripheral portion of the oil hole has formed a laser-melted portion,
a circularity of an outer shape of the cylinder is 20 μm or less, and
the laser-melted portion exists within a range of less than 50 μm from a surface of the inner peripheral portion of the oil hole so that hardening of an outer peripheral portion of the oil hole is suppressed and a contact area with respect to a holder is increased.

6. The sliding bearing according to claim 5,
wherein the oil hole is a long hole extending in a circumferential direction, and
the long hole has a length of ⅙ or more of a half circumference of the cylinder.

7. The sliding bearing according to claim 6, wherein a degree of contour of an inner diameter of the oil hole is 0.15% or less of the inner diameter of the oil hole.

8. The sliding bearing according to claim 5, wherein a degree of contour of an inner diameter of the oil hole is 0.15% or less of the inner diameter of the oil hole.

* * * * *